UNITED STATES PATENT OFFICE.

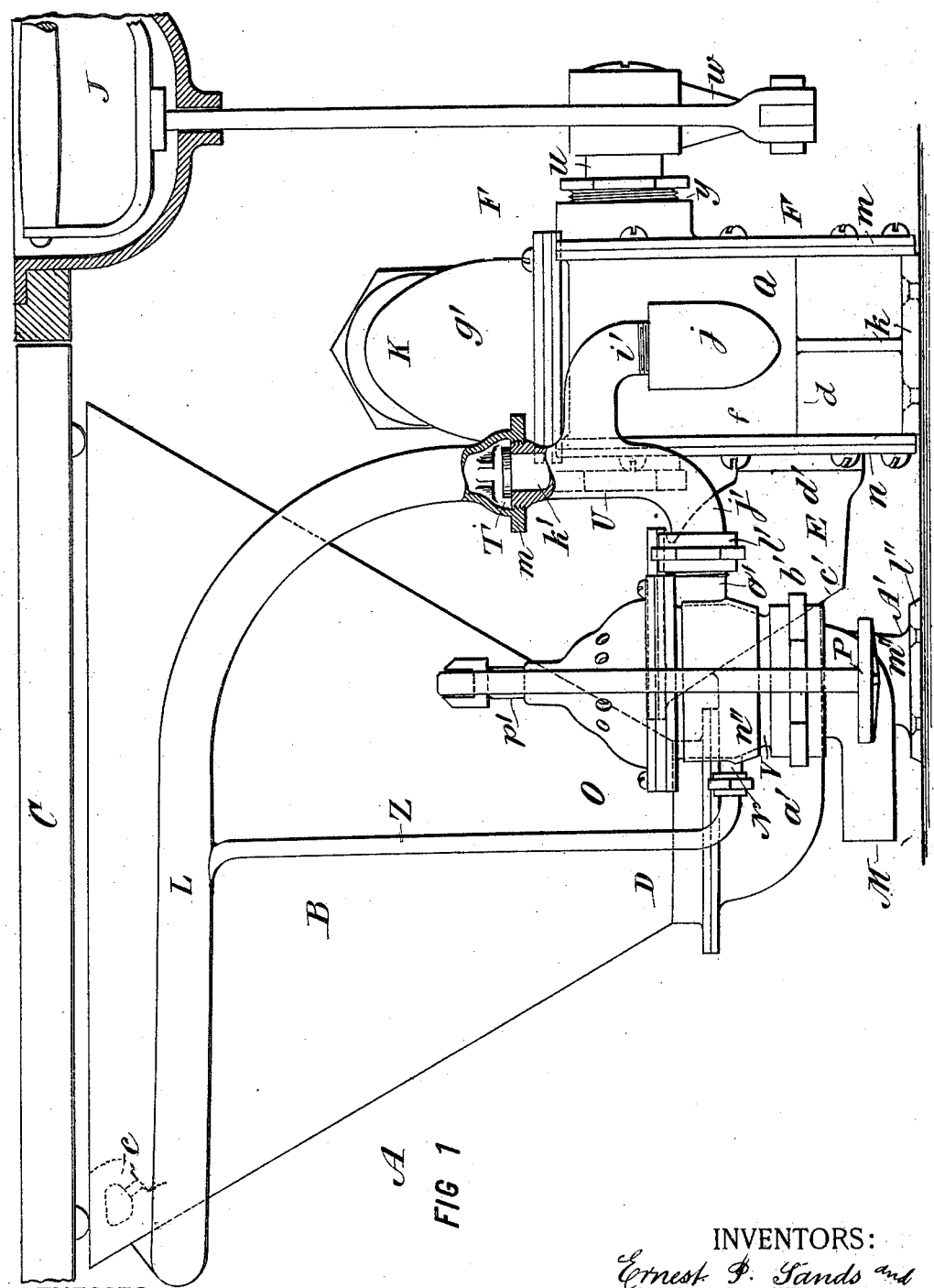

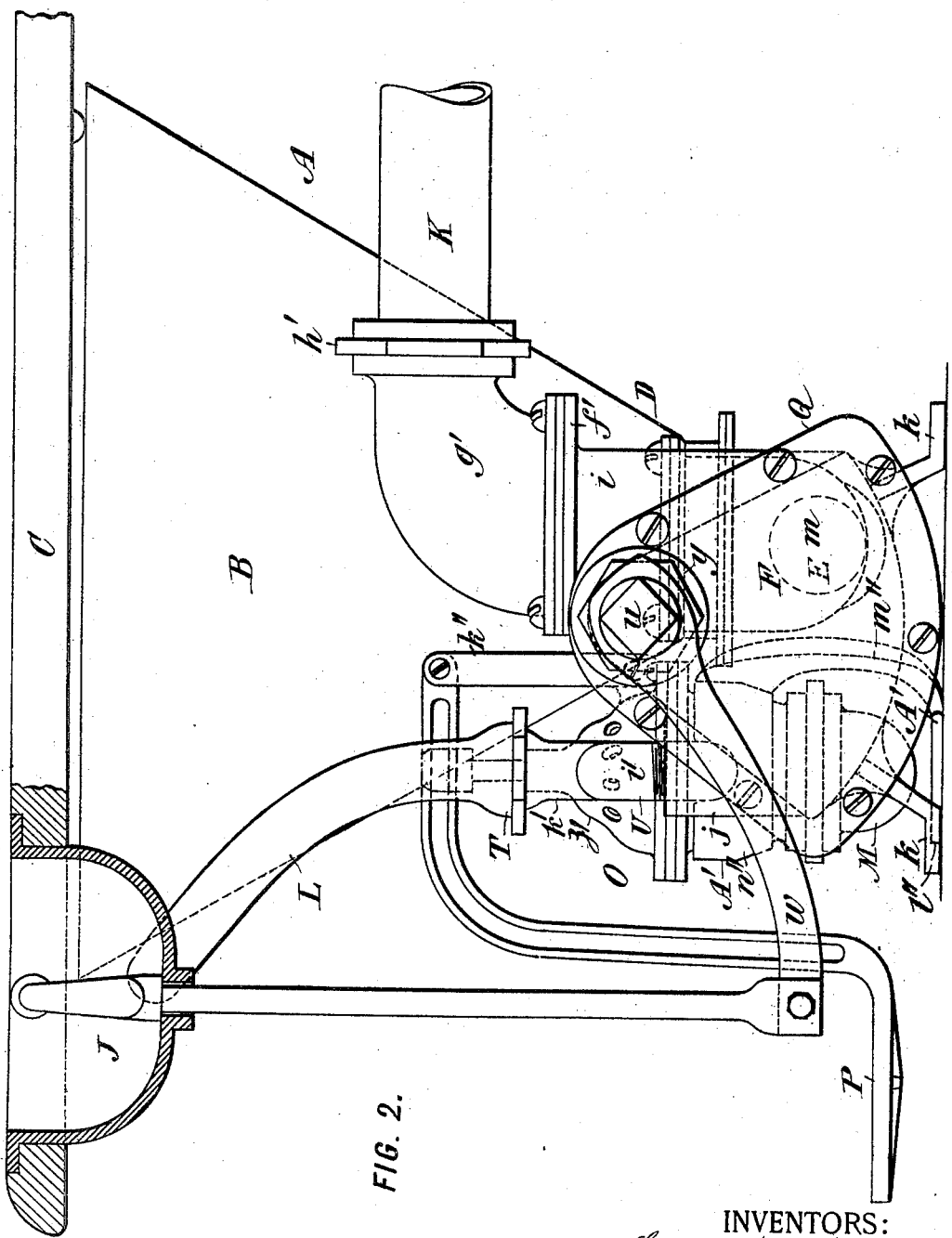

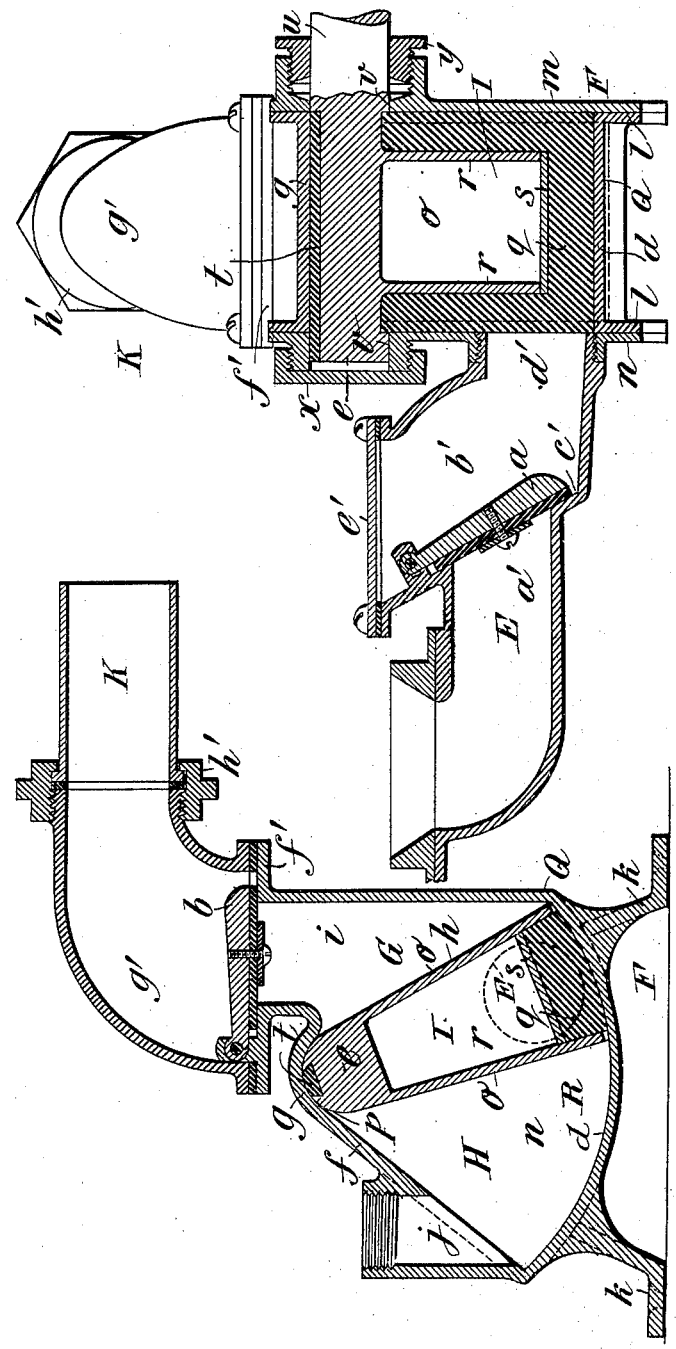

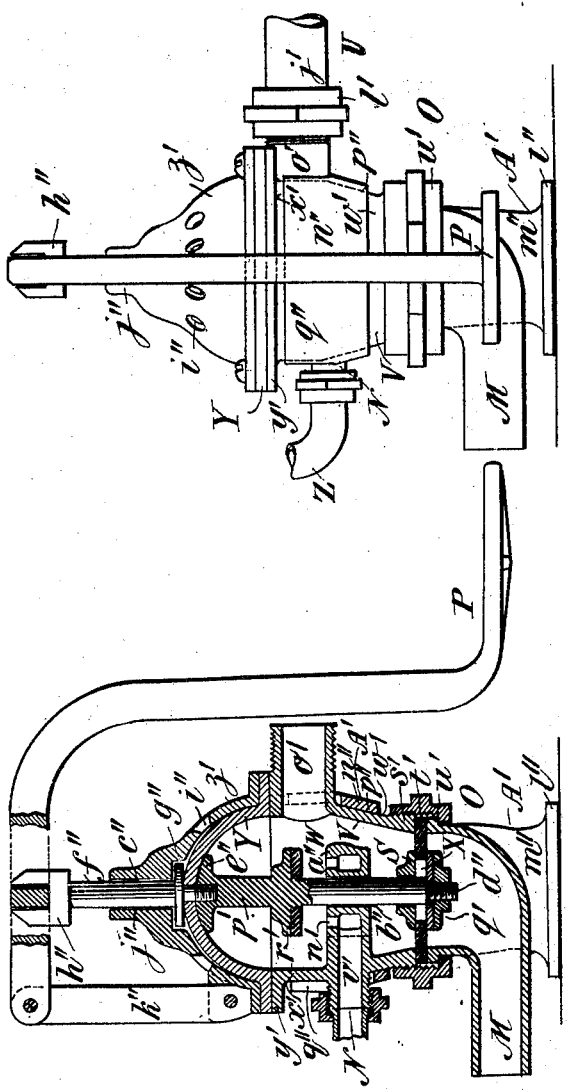

ERNEST P. SANDS AND JOHN CORCORAN, OF NEW YORK, N. Y.; SAID CORCORAN ASSIGNOR TO SAID SANDS.

PUMP AND VALVE FOR SHIPS' OR OTHER CLOSETS, &c.

SPECIFICATION forming part of Letters Patent No. 689,914, dated December 31, 1901.

Application filed December 21, 1895. Renewed July 10, 1901. Serial No. 67,808. (No model.)

*To all whom it may concern:*

Be it known that we, ERNEST P. SANDS and JOHN CORCORAN, citizens of the United States, and residents of the city, county, and State of New York, have jointly invented certain new and useful Improvements in Pumps and Valves for Ships' or other Closets and other Purposes, of which the following is a specification.

This invention relates to pumps and valves for use with ships' and other closets and for other purposes, and aims to provide certain improvements in such devices and in closets containing the same.

Heretofore, especially for ships' closets, it has been usual to employ a piston-pump to remove and discharge the soil from the closet, a water-pump, either separately or combined with the piston-pump, for supplying flushing-water to the closet, a handle operating both pumps, and an air and water valve supplying when opened flushing-water for the pump and permitting when closed an inflow of air to relieve any vacuum in the latter. By thus relieving such vacuum the operation of the pump for discharging has been rendered easy independently of the flushing action. In apparatus of this character the expense of construction, the space occupied by the parts, and the liability to impairment, wear, or obstruction from use have been so great as to interfere with or prevent the employment of the apparatus in many instances.

Our improvements relate more especially to apparatus of this general character and are particularly applicable to apparatus similar to that just described and aim to provide an improved pump, an improved valve, and certain other features of improvement, and to provide apparatus of this character which shall be compact and convenient, easy, accurate, and effective in construction, inexpensive in initial cost, and economical of repair, and which shall be applicable to all uses under which former apparatus of this character could be employed. To this end in carrying out our invention in its preferred adaptation we employ several features of improvement, preferably in combination, these features comprising an improved and preferably an oscillating pump performing two operations, the one the soil-discharging and the other the flushing operation, an improved valve for the flushing-water, improved means for insuring facile working of the apparatus whether or not flushing is required, and certain other features of improvement, which will be hereinafter fully set forth.

In the accompanying drawings, which illustrate one and the preferred adaptation of our invention as applied to a ship's closet, Figure 1 is a fragmentary front elevation of a closet provided with our improvements. Fig. 2 is a fragmentary side elevation thereof. Fig. 3 is a fragmentary vertical section of our improved pump. Fig. 4 is a fragmentary vertical transverse section thereof. Fig. 5 is a vertical section of our improved valve. Fig. 6 is a front elevation thereof.

Referring to the drawings, let A indicate a closet; B, the bowl thereof; C, the seat thereof; D, the outlet therefrom; E, the discharge-pipe from this outlet; F, the pump; G, the soil-pump thereof; H, the water-pump thereof; I, the plunger thereof; J, the pump-handle; K, the soil-discharge; L, the flushing-pipe; M, the water-pipe; N, the air-pipe; O, the air and water valve, and P the operating-treadle therefor. These parts may each and all be of any usual or suitable construction in their general features and may operate according to any known or usual method without materially affecting our improvements. As shown, the bowl B is an ordinary closet-bowl having a hollow interior, a flushing-rim at top, and a discharge D at bottom, which discharge communicates through the outlet E with the soil-pump, being separated from the latter by a clack-valve $a$. From the pump the soil is delivered past a clack-valve $b$ to the discharge-pipe K, through which it passes to any desired place, usually directly into the ocean when the closet is a ship's closet, and in such event usually below the water-level. The handle J is lifted or lowered to operate the pump for both its functions. The flushing-pipe L communicates between the flushing-rim $c$ of the bowl and the water side of the pump. The water-pipe M leads from any suitable source of supply, usually from the outer water and from below the level of the latter, and supplies water to the pump, from which it is in turn fed to the flushing-rim. The valve O controls this supply, thereby determining whether the closet shall be simply emptied or both flushed and emptied.

Referring to the drawings, we will now describe in detail the preferred form of our improvements as therein shown.

According to one feature of improvement the pump F is an oscillating pump having a peculiarly-formed casing Q, having a hollow internal plunger-chamber R, corresponding in outline to a segment of a cylinder, and having an oscillating plunger I, moving from side to side of this chamber, swinging on an axis near one end thereof and dividing or partitioning the chamber into the soil and flushing compartments or pump members G and H, which compartments are simultaneously varied in area with the swinging of the plunger. The casing Q has a curved bottom wall $d$, struck from the axis $e$, on which the plunger swings, straight wall $f$, extending diagonally from this bottom wall upward, arc-shaped top wall $g$, struck from the axis $e$, straight side wall $h$, extending from the bottom wall to and meeting the top wall, vertical discharge-pipe $i$, rising from the wall $h$, and like discharge-pipe $j$, rising from the wall $f$. From the under side of the bottom wall extend feet $k$, which are braced laterally and longitudinally of the casing by thin webs cast integrally therewith, which feet serve as means for fixing the casing to the floor, to which it may be attached in any suitable manner, as by a plurality of screws. The casing Q is open-sided, the walls of the compartment R extending through it laterally as rectilinear walls from one edge of the face $l$ to the other edge of the face $l$ of the casing. Its sides are closed, the one by a flat side plate $m$ and the other by a similar plate $n$, the inner faces of which are flat and straight and constitute the side walls of the compartment R. The plunger I is rectangular in side elevation, corresponds in shape to the transverse section of the compartment R, and snugly fits the latter, with a leak-tight joint extending across the bottom and top walls and the two vertical side walls of the compartment. In cross-section the shape of the plunger is adapted to the shape of the walls $f$ and $h$ of the casing Q, the preferred shape being that shown, wherein the plunger has straight imperforate side walls $o$, extending from its curved top $p$ to near its lower extremity and slightly spreading as the latter is approached, these walls being adapted to come substantially flush with the opposing wall of the casing when the plunger vibrates in order to practically empty the intervening portion of the interior of the pump at each stroke of the plunger. To effect a tight fit between the plunger and casing, we prefer to employ the packing material $q$. That shown consists of a U-shaped piece of rubber surrounding three sides of the plunger between the side walls thereof, projecting slightly beyond the edges of these walls and seating against webs $r$, extending from one side wall to the other at sides, and a plate $s$, extending from one web to the other at bottom. At top an additional packing $t$ is set into a groove in the top of the plunger.

To oscillate the plunger, it is provided with a spindle $u$, that shown being formed integrally with it, seated in the bearings $v$ in the side plates of the pump and having a projecting squared end receiving a lever-arm $w$, to which the handle J is connected. Leakage around the spindle $u$ is prevented by a cap $x$ covering one end and a stuffing-box $y$ around the projecting end. The arm $w$, handle J, and pressure of flushing-water each constitute means for holding the plunger over the outlet E and for moving it to that position.

According to our invention the soil-inlet E to the pump is so disposed relatively to the plunger and the latter and its operating parts are so arranged that when the plunger is in the normal position it will rest over and close this inlet, thereby acting as a valve for the latter and preventing the possibility of leakage to the bowl therethrough should the clack-valve $b$ fail to exclude a reverse flow of water. This is best accomplished by placing the soil-inlet E at that portion of the side plate $n$ opposite which the plunger I is located when it is in the extreme position toward the wall $h$, as thereby the pump is free from soil and only its water side H is full.

In the details of construction the soil-pipe E is provided with a tubular part $a'$, leading horizontally from the bowl, a larger chamber $b'$ beyond this, an inclined wall $c'$, through which the pipe $a'$ opens into the chamber and against which the clack-valve $a$ rests, a contracted neck $d'$, screwing into the plate $n$, and a removable cover $e'$, by opening which access can be had to the valve $a$.

The neck $i$ of the casing Q is best formed with a wide flange $f'$ at top, and the discharge-pipe K consists of a chambered elbow $g'$, seating on this flange, of larger diameter than the opening from the neck $i$ therein and inclosing the clack-valve $b$. At its other end the elbow is coupled by any suitable provision, as the union $h'$, with such pipe or pipes as are necessary to deliver the soil discharge where desired.

In operation, the pump being in the position shown in Fig. 3, the raising of the lever-handle J throws the plunger to the opposite side of the compartment R, thus reducing the flushing-chamber H and driving its water to the flush-rim and enlarging and creating a partial vacuum in the soil-chamber G, so that soil is sucked through the pipe E from the closet to fill the chamber. On the depression of the handle the plunger swings to the reverse position, filling the chamber H with flushing-water and discharging from the chamber G, past the valve $b$, the soil in the chamber G. This operation is continued until the soil is all removed from the closet and driven beyond the pump and the bowl properly flushed and charged with clean water.

The flushing-water pump comprises in addition to the chamber H suitable check-valves for guiding and controlling the water. The one valve S is the suction-valve and the other, T, is the discharge-valve. We prefer to place the suction-valve within and use it as part of our combined valve O and to place the discharge-valve at the beginning of the flushing-pipe L, connecting this by a tube U, having a pump branch $i'$, leading from the neck $j$, a suction branch $j'$, leading from the valve O, and a discharge branch $k'$, leading to the flushing-pipe L. This tube is separably coupled to the valve O by a union $l'$, to the pipe L by a threaded flange $m$, integral with the latter, and to the pipe $j$ by a screw-thread connection. The valve T is a simple clack-valve carried on the top of the pipe U, and the valve S is a simple valve controlling backflow to the water-pipe M.

Other features of improvement are found in the valve O. In the construction shown they consist of a casing or body V, having a hollow interior W, an inlet-duct X for water at bottom, an inlet-duct $n'$ beyond the latter for air, a flexible diaphragm or piston Y, closing it at top, a neck $o'$, receiving the union $l'$ of the pipe U, a valve-rod $p'$, a water-valve $q'$, and an air-valve $r'$. The shell V is shown as a cast-metal shell, having tubular screw-threaded lower end $s'$, on which are clamped a separate apertured plate $t'$ and the end of the water-pipe M by a union $u'$. The inlet-aperture X is formed through the plate $t'$. Above this plate the exterior of the shell is slightly tapered or coned at $w'$ and above this is substantially circular at $x'$, terminating in a top flange $y'$, on which seats the edge of the diaphragm Y, which is clamped thereon by a perforated hood or cap $z'$. The neck $v'$ extends inwardly of the shell V, and the air-ducts $n'$ are formed in the flat annular top face $a''$ of this neck. A vertical hole $b''$, concentric with the axis of the shell, traverses this neck, and a similar hole $c''$, of like disposition, is formed through the hood above the shell. The valve-stem $p'$ is held movably in these holes, extending through the valve from above the hood on top to the valve $q'$ at bottom. The valve-stem is a rigid member formed, for convenience, of two pieces, the lower one, $d''$, having a valve $q'$ fixed on its lower end beyond the under side of the plate $t'$, having the valve S freely surrounding its lower end above this plate, having the valve $r'$ fixed to it above the neck $v'$, and having an internally-screw-threaded upper end formed with a wide enlarged head $e''$, embracing the inner face of the diaphragm Y. The other part, $f''$, of the valve-stem has a screw-threaded end entering and clamping it to the upper end of the lower part of the stem, a wide shoulder $g''$ above this head, embracing and making a tight joint with the outer side of the diaphragm Y, and a forked end $h''$ beyond the hood and embracing the treadle P. The holes $b''$ and $c''$ guide the valve-stem in its movements incidental to opening and closing the valve. In the opening movement the valve-stem moves down under the pressure exerted by the foot on the treadle P. This downward movement distorts inwardly the flexible and elastic diaphragm Y, opens the valve $q'$ outwardly against the inflowing stream of flushing-water coming from the pipe M, and seats the valve $r'$ on the seat $a''$, thus closing communication with the air-pipe N and arresting further movement of the valve. Meantime the clack-valve S may remain seated until lifted by the inflowing water passing through the inlet X. This condition of the parts remains throughout the depression of the treadle, and while the parts are so located the operation of the flushing-pump will draw water past the valves $q'$ and S into the chamber H and then force it from the latter past the valve T to the flushing-pipe for flushing the closet. During the latter portion of the operation the clack-valve S will be seated as soon as the change of the water-current takes place, thus preventing return of water when the suction ceases, and during the first-mentioned operation the check-valve T will close, so that the suction shall not be interfered with by reverse communication through the flushing-pipe. Where the water is under sufficient head in the pipe M, it will rush through the valve without awaiting the operation of the pump and pass by the flushing-pipe to the closet. Should this flow not be desired or should it be the purpose of the user to empty the closet without flushing, the treadle P will not be depressed or if depressed will be released. When the treadle is released, it automatically rises through the closing of the water-valve $q'$ under the pressure of the water within the valve-casing, or of the water within the pipe M, or of the elasticity of the diaphragm Y, as desired. Preferably we utilize all three of these forces for restoring the valve to the closed position and incidentally for raising the treadle. By placing the valve $q'$ at the outer side of the partition $t'$ and making it move against the current to open we obtain the advantage of having it close with the current. By utilizing the diaphragm Y or any equivalent movable member as a portion of the wall of the chamber of the valve we take advantage of the pressure of water therein to move the valve toward the closed position. Employing an elastic diaphragm enables the utilization of its elasticity also to this end. We prefer to make a diaphragm of substantially hemispherical form, of elastic rubber or other suitable material, and to reinforce it by the hood $z'$, which has an inner face substantially coinciding with the normal exterior of the diaphragm, perforations or apertures $i''$ permitting the inflow and outflow of air as the diaphragm moves, and a long neck $j''$, through which the hole $c''$ for the valve-stem is formed. For convenience the treadle P is coupled to the hood $z'$ by a link $k''$.

When the water-valve $q'$ is closed, it would require great force to work the pump against the vacuum. To obviate this, automatically-opening air-valves have been employed, which yield under suction and permit ingress of air to the pump. By our improvements the valve $r'$ serves this purpose. This valve is preferably constantly open, while the water-valve is closed and continually closed while the latter is at the maximum open position. In fact the air-valve acts as a stop for the opening movement of the water-valve in that the treadle P is constructed to descend until it is arrested by the valve-stem, which itself is arrested by the seating of the air-valve on the face $a''$. Thus when no water can pass to the interior of the shell the air-valve is open to always permit the free flow of air thereto.

A further feature of improvement provides a contracted conduit between the pump suction and discharge for relieving resistance to the operation of the flushing portion of the pump. This is best accomplished by extending a small pipe from the flushing-pipe L to the air-pipe N, as shown in Fig. 1. This pipe is in reality the air-pipe, which instead of being run over the edge of the bowl, as heretofore, is wiped into the upper portion of the flushing-pipe, so that its hollow interior constitutes part of a continuous circuitous conduit around the discharge-valve T of the pump and suffices to permit a sufficient indrawing of air from the flushing-pipe when the pump is worked with the water-valve closed to break the vacuum during the suction-stroke. During the discharge-stroke this air will rise past the valve T, and during the next suction-stroke it will be drawn into the pump-chamber through the pipe Z.

Our invention provides for properly supporting the combined valve O and still permitting its ready removal, if required. Preferably we provide a bracket A', having a base-plate $l''$ screwed to the floor, vertically-extending posts $m''$, rising from one side of this base, and an annular or substantially annular receiver $n''$, carried at the upper end of this leg and fitting and embracing the exterior of the shell V of the valve. This receiver preferably has a tapering portion $p''$, receiving the like portion of the shell, and a cylindrical portion $q''$, receiving the cylindrical portion of the shell. Thus the shell will be firmly held in the receiver against the strains on its treadle in use, and by loosening its couplings with the several pipes communicating with it it can be lifted from the holder without necessarily disturbing the fastenings for any of the other parts of the apparatus.

In operation the closet will be emptied or flushed by repeating the lifting and lowering of the pump-lever until the desired result is attained. Should any user neglect to open the water-valve or be ignorant of the necessity for depressing the treadle to attain this, the emptying of the closet will proceed as easily as though this operation had been attended to.

It will be seen that our invention provides improvements which can be readily and advantageously availed of and that the pump and valve apparatus can according to our improved construction be rendered so diminutive and compact as to be brought very close to the outlet from the closet and carried in large part underneath the tapering walls of the bowl. The several parts can be readily removed for repair or cleaning if necessary, the pump and its plunger being exposed for this purpose by simply removing the outer side plate $m$, which carries with it the plunger, unless the latter is separated from the plate during removal thereof. The valve can be readily uncoupled and removed without interfering with the use of the closet or of the pump. Access to the valves and the soil-passages is readily had by removing the part over either.

It will be understood that our invention is not limited to the particular details of construction, combination of features, or of the particular use hereinbefore set forth as constituting its preferred form, but that it can be availed of according to such modifications in any of these respects as circumstances or the judgment of those skilled in the art may dictate without departing from the spirit of the invention.

What we claim is, in valves and pumps and the like for ship and other closets and other purposes, the following-defined novel features and combinations, substantially as hereinbefore set forth, namely:

1. For water-closets and other purposes, the combination with a bowl, of a pump comprising a casing and an oscillating plunger swinging therein through the arc of a circle, and dividing the interior of said casing into two distinct and isolated chambers, the one a soil-pump at one side of said plunger communicating with the outlet from said bowl, and a discharge-passage from said soil-chamber, and the other a water-chamber at the other side of said plunger, a water-supply passage for said water-chamber, and a flushing-pipe leading therefrom to said bowl, said plunger when oscillating in one direction emptying said bowl and forcing flushing-water thereto, and when moving in the other direction discharging the contents from said bowl, the suction and discharge of said soil-pump being isolated from and independent of those of said water-pump and means normally holding said plunger opposite said soil-passage for closing it.

2. For closets and the like, an oscillating pump F having a single shell Q having two separate pump-chambers G and H, an intermediate oscillating plunger I, a soil suction-pipe E parallel with the axis of said plunger, and a soil-discharge pipe K leading to said chamber G, a water-pipe M, a flushing-pipe L, and an air-relief pipe N communicating with said chamber H, and independent of said pipes E and K.

3. In valves for pumps and the like, a water-valve closing with the flow, and a relief-valve connected to move together, a water-passage controlled by the one and a relief-passage controlled by the other, a valve-stem connecting and moving said valves, and independent means moving said stem, said valves disposed, the relief-valve to close with the movement of the water-valve to the open position, and to open with the movement of the water-valve to the closed position and a clack-valve movable independently of said valves and controlling backflow through said water-valve.

4. In valves, a water-valve opening against a current, and a clack-valve opening with the current, and means carrying both said valves permitting movement of the one relatively to the other.

In witness whereof we have hereunto signed our names in the presence of two subscribing witnesses.

ERNEST P. SANDS.
JOHN CORCORAN.

Witnesses:
LOUIS SANDS,
J. HARRY CURTISS.